United States Patent Office 3,052,544
Patented Sept. 4, 1962

3,052,544
ANTIFOGGANT AND STABILIZER FOR PHOTOGRAPHIC SILVER HALIDE EMULSIONS
Fritz Dersch, Binghamton, N.Y., assignor to General Aniline & Film Corporation, New York, N.Y., a corporation of Delaware
No Drawing. Filed Mar. 6, 1959, Ser. No. 797,596
8 Claims. (Cl. 96—107)

This invention relates to a novel antifoggant and stabilizer for use with photographic silver halide emulsions. More particularly, this invention relates to the use of copolymers of vinyl pyrrolidone and vinyl acetate as a fog inhibiting agent and stabilizer for photographic silver halide emulsions sensitized by means of polyalkylene oxides or condensation products thereof.

It is well known that polyalkylene oxides such as polyoxyethylenes and polyoxypropylenes increase the speed of silver halide emulsions. It has also been observed that condensation products of alkylene oxides with amines, carboxylic acids, alcohols, amides or phenols (made according to U.S. Patents 1,970,578 and 2,213,477) and dicyclohexylol-dialkyl methane (see U.S. Patent 2,240,472) have been used as sensitizers. The polyalkylene oxides or the alkylene oxide condensation products useful as sensitizers have a molecular weight of at least 300 and preferably 1500 to 4000 or more.

The use of the polyalkylene oxides or alkylene oxide condensation products as sensitizers is limited because of their tendency to increase the formation of fog during storage of the photographic film, especially storage at elevated temperatures and humidities. The use of conventional antifoggants is not sufficient to satisfactorily eliminate or minimize fog formation in a film coated with an emulsion containing such products as sensitizers. Special antifoggants had to be found for use with such emulsions and, in this connection, reference is made to U.S. Patents 2,704,716, 2,716,062 and 2,728,666. However, the antifoggants diclosed in these patents leave much to be desired by way of reducing the fogging tendencies of alkylene oxide type sensitizers.

It is an object of this invention to provide a novel antifoggant and stabilizer for use with photographic silver halide emulsions sensitized with polyalkylene oxides or alkylene oxide condensation products.

A still further object of this invention is to provide a light-sensitive photographic film coated with an emulsion containing a polyalkylene oxide or alkylene oxide condensation product as a sensitizer and a vinylpyrrolidone-vinyl acetate copolymer as an antifogging and stabilizing agent.

Other objects and advantages of this invention will appear to those skilled in the art from the detailed description thereof and given below.

It has now been discovered that vinylpyrrolidone-vinyl acetate copolymers form excellent antifoggants and stabilizers for light-sensitive silver halide emulsions and especially those emulsions which have been sensitized with polyalkylene oxides or their condensation products. These copolymers perform their function without seriously affecting the speed and/or contrast of the emulsion with which they are associated.

The vinylpyrrolidone-vinyl acetate copolymers are long chain compounds having the following general formula:

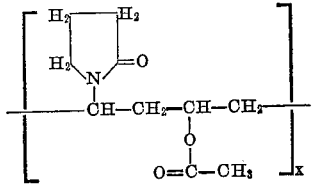

wherein $x$ is an integer. These compounds which are described in U.S. Patent 2,821,519 will hereafter be referred to by the symbol PVP/VA for the sake of brevity.

Depending upon the degree of polymerization, PVP/VA has a molecular weight ranging from 500 to 200,000. Viscosity measurements (K-value) are used as an indication of the average molecular weight of the polymers. The viscosity coefficient K is fully described in "Modern Plastics," 23, No. 3, pages 157–161, 212, 214, 216 and 218 (1945), and is calculated as followed:

$$\frac{\log_{10} \eta \text{ rel}}{C} = \frac{75K^2}{1+1.5C} + K$$

where C is the concentration in grams per 100 cc. of polymer solution and $\eta$ rel is the ratio of the viscosity of the solution to that of the pure solvent. The K values are reported as 1000 times the calculated viscosity coefficient in order to avoid the use of decimals. The K value of the polymer I prefer to use ranges from 20 to 60.

The polyakylene oxides are known compounds and their preparation is described in "The Chemistry of Synthetic Resins," by Ellis (1935) (pages 990–994). These compounds are also known as polyalkylene glycols and they may be derived from ethylene oxide, propylene oxide and butylene oxide.

The use of the polyalkylene oxides or derivatives of alkylene oxides as sensitizers for silver halide emulsions is described in the following U.S. Patents: 2,240,472, 2,400,-532, 2,423,549 and 2,441,389; and British Patent 443,559.

The following are examples of specific polyalkylene oxide compounds and derivatives thereof that may be used as sensitizers in silver halide emulsions according to my invention.

$$HOCH_2CH_2O(CH_2CH_2O)_nCH_2CH_2OH$$

Polyethylene oxide

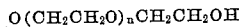
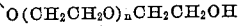

Di-(polyethylene-glycoxy)-decane $$HOCH_2CH_2O(CH_2CH_2O)_nCH_2CH_2OC_{17}H_{33}$$

Polyethylene oxide oleyl ether $$HOCH_2CH_2O(CH_2CH_2O)_nCH_2CH_2OC_{12}H_{25}$$

Polyethylene oxide lauryl ether

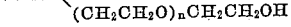

N,N-polyethylene oxide substituted fatty acid amides $$RCOO(CH_2CH_2O)_nCH_2CH_2OH$$

Mono-fatty acid esters of polyoxyethylene glycol $$HO(CH_2CH_2O)_n(CH_2CH_2CH_2O)_n$$
$$(CH_2CH_2O)_nCH_2CH_2OH$$

Polyethylene-polypropylene oxide

In the above formulae, $n$ is an integer greater than 10 and R is a fatty alkyl group having from 12 to 18 carbon atoms.

The silver halide emulsions suitable for use with my invention may be prepared in a conventional manner by (1) emulsification and digestion or ripening of the silver halide, (2) the elimination of aqueous soluble salts as by washing and (3) the second digestion or after-ripening to obtain increased sensitivity.

The PVP/VA antifoggant of my invention may be added or contacted with the emulsion at any stage during its processing. Thus, the PVP/VA may be added as a "ripening final" or a "coating final." "Ripening final" is added during the ripening or sensitivity increasing stage of the emulsion-making process and such addition may be made before, during or after the addition of the soluble silver salt to the soluble halide in the presence of a suitable colloid such as gelatin, polyvinyl alcohol, solubilized casein, albumin and the like. When added as a "coating final," the PVP/VA is combined with the emulsion just prior to coating and when maximum sensitivity has almost been attained. Such emulsions are coated on the usual supports familiar to the art as exemplified by glass, paper or film.

In some instance, it is advantageous to apply the antifogging and stabilizing compounds in separate layers adjacent to the emulsion as, for example, in a separate undercoating layer or in the anti-abrasion gelatin surface. In other instances, the desired result may best be achieved by adding the antifoggant and stabilizer to one or all of the processing baths for the involved emulsion.

The PVP/VA may be added to the emulsion in an amount to produce a concentration of PVP/VA in the emulsion of 50 milligrams to 2 grams per gram mol of silver halide in the emulsion. The optimum concentration is about 500 milligrams PVP/VA per mol of silver halide.

The following example illustrates my invention. It is to be understood, however, that this example is given by way of illustration only and not by way of limitation.

*Example*

A silver halide emulsion in gelatin containing 4% silver iodide and 96% silver bromide was prepared in a conventional manner and brought up to its maximum light sensitivity. It was then readed for coating, finals were added such as sensitizing dyes, stabilizers and hardeners. A 10% aqueous solution of polyethylene oxide lauryl ether (prepared from 1 mole of lauryl alcohol and 35 mols of ethylene oxide) was prepared and added to the emulsion. Also a 10% aqueous solution of PVP/VA (average K value of 30 to 50) was prepared and added to the emulsion. The emulsion samples contained about 0.4 mol of silver halide. The so-prepared emulsion samples were coated on a suitable celulose ester base and dried. Samples of these film coatings were then exposed in a type IIB Sensitometer and developed in a developer of the following composition:

| | grams |
|---|---|
| Metol | 1.5 |
| Sodium sulfite, anhydrous | 45 |
| Sodium bisulfite | 1 |
| Hyroquinone | 3 |
| Sodium carbonate, monohydrated | 6 |
| Potassium bromide | .8 |
| Water to make 1 liter. | |

The results obtained were as follows:

| Quantity of Ethylene Oxide Lauryl Alcohol Condensation Product | Quantity of PVP/VA Added, mg. | Relative Speed | Fog 12' | Oven Fog 4' |
|---|---|---|---|---|
| 0 | 0 | 100 | .14 | 0.08 |
| 1 g | 0 | 160 | .26 | 0.12 |
| 1 g | 25 | 160 | .21 | 0.10 |
| 1 g | 250 | 160 | .20 | 0.08 |

My invention is not limited to the detailed description contained herein, but includes all modifications that fall within the scope of the appended claims. Typically, in lieu of the ethylene oxide derivative of the example, I may use equally well any of the ethylene oxide derivatives referred to herein.

I claim:
1. A light-sensitive organic colloid silver halide emulsion containing in addition to said colloid a vinylpyrrolidone-vinyl acetate copolymer as an antifogging and stabilizing agent.
2. A light-sensitive gelatino-silver halide emulsion containing a vinylpyrrolidone-vinyl acetate copolymer as an antifogging and stabilizing agent.
3. A light-sensitive organic colloid silver halide emulsion containing a sensitizing compound selected from the group consisting of polyalkylene oxide and condensation products thereof and containing, in addition to said colloid, a vinylpyrrolidone-vinyl acetate copolymer as an antifogging and stabilizing agent.
4. A light-sensitive silver halide emulsion as recited in claim 3 wherein the sensitizing compound is polyethylene oxide lauryl ether.
5. A light-sensitive silver halide emulsion as recited in claim 3 wherein the vinylpyrrolidone-vinyl acetate copolymer is present in a concentration of from about 50 milligrams to about 2 grams per mol of silver halide.
6. A light-sensitive photographic element comprising a base and a coating of a gelatino-silver halide emulsion thereon, said emulsion having a vinylpyrrolidone-vinyl acetate copolymer incorporated therein as an antifogging and stabilizing agent.
7. A light-sensitive photographic element as recited in claim 6 wherein said emulsion is sensitized with a compound selected from the group consisting of polyalkylene oxide and condensation products thereof.
8. A light-sensitive photographic element as recited in claim 7 wherein said compound is polyethylene oxide lauryl ether.

References Cited in the file of this patent

UNITED STATES PATENTS

| 2,882,262 | Smith et al. | Apr. 14, 1959 |
| 2,941,980 | Robinson | June 21, 1960 |

FOREIGN PATENTS

| 687,751 | Great Britain | Feb. 18, 1953 |